(12) United States Patent
Hirahara

(10) Patent No.: US 8,179,114 B2
(45) Date of Patent: May 15, 2012

(54) VOLTAGE CONVERTING DEVICE AND VOLTAGE CONVERTING METHOD

(75) Inventor: Minoru Hirahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 472 days.

(21) Appl. No.: 12/379,605

(22) Filed: Feb. 25, 2009

(65) Prior Publication Data

US 2009/0295355 A1    Dec. 3, 2009

(30) Foreign Application Priority Data

May 29, 2008    (JP) ................. 2008-141403

(51) Int. Cl.
*G05F 1/40*    (2006.01)
*G05F 1/613*    (2006.01)
(52) U.S. Cl. .................. 323/285; 323/225; 323/271
(58) Field of Classification Search .......... 323/222–225, 323/268, 271, 282–285
See application file for complete search history.

(56) References Cited

U.S. PATENT DOCUMENTS

| | | | | |
|---|---|---|---|---|
| 5,390,070 | A * | 2/1995 | Niedermeier | 361/152 |
| 5,982,160 | A | 11/1999 | Walters et al. | |
| 6,366,070 | B1 * | 4/2002 | Cooke et al. | 323/284 |
| 6,674,272 | B2 * | 1/2004 | Hwang | 323/284 |
| 7,304,464 | B2 * | 12/2007 | Weng et al. | 323/285 |
| 7,834,598 | B1 * | 11/2010 | Wortham et al. | 323/224 |
| 2003/0035307 | A1 | 2/2003 | Matsuura et al. | |

FOREIGN PATENT DOCUMENTS

| | | |
|---|---|---|
| CN | 1402420 | 3/2003 |
| CN | 1899744 | 1/2007 |
| JP | 2000-227808 | 8/2000 |
| JP | 2001-224176 | 8/2001 |
| JP | 2002-051542 | 2/2002 |
| JP | 2002-101651 | 4/2002 |
| JP | 2002-159173 | 5/2002 |
| JP | 2003-61351 | 2/2003 |
| JP | 2004-304861 | 10/2004 |
| JP | 2006-187159 | 7/2006 |
| JP | 2006-242742 | 9/2006 |
| JP | 2006-288047 | 10/2006 |
| JP | 2006-288070 | 10/2006 |
| JP | 2007-21560 | 2/2007 |

OTHER PUBLICATIONS

Korean Office action issued Dec. 20, 2010 in corresponding Korean Patent Application 10-2009-0021999.
Chinese Office Action for corresponding Chinese Patent Application No. 200910128852.8, issued on Apr. 21, 2011.

* cited by examiner

*Primary Examiner* — Matthew Nguyen
(74) *Attorney, Agent, or Firm* — Staas & Halsey LLP

(57) ABSTRACT

A changing-speed calculator monitors a current value of an output current flowing through a load circuit to calculate a change speed of the current value. A correction-amount obtaining unit reads from a correction-amount table a correction amount of a duty ratio corresponding to the change speed of the output current. A reference-voltage comparator compares a voltage value of an output voltage to be applied to the load circuit and a predetermined reference voltage with each other, and then notifies a duty-ratio determining unit of the comparison result. The duty-ratio determining unit performs feedback control according to the comparison result of the voltage values to correct the duty ratio. After correcting the duty ratio, the duty-ratio determining unit further corrects the duty ratio by the correction amount obtained by the correction-amount obtaining unit.

10 Claims, 8 Drawing Sheets

VOLTAGE CONVERTING DEVICE AND VOLTAGE CONVERTING METHOD

CROSS-REFERENCE TO RELATED APPLICATIONS

This application is based upon and claims the benefit of priority of the prior Japanese Patent Application No. 2008-141403, filed on May 29, 2008, the entire contents of which are incorporated herein by reference.

BACKGROUND

1. Field

The present invention relates to a voltage converting devices and a voltage converting method.

2. Description of the Related Art

In general, when a voltage is supplied from a power supply, such as a direct-current (DC) power supply or an alternating-current (AC) power supply, to a load circuit, a switching converter may be used so that the voltage required for operating the load circuit is stably supplied. The switching converter includes switching elements for quick switching, such as transistors, controlling a duty ratio and switching frequency of the switching elements to convert a power-supply voltage input from the power supply to a desired output voltage.

FIG. 14 is a drawing of an example of configuration of a general DC/DC converter that converts a power-supply voltage $V_{in}$ of a DC power supply 11 to an output voltage $V_o$ to be applied to a load circuit 16. The DC/DC converter depicted in the drawing includes a transistor 12, a transistor 13, a coil 14, a capacitor 15, an operational amplifier 17, and a Pulse Width Modulation (PWM) circuit 18. The DC/DC converter depicted in FIG. 14 is a switching converter that always outputs the constant output voltage $V_o$ even when an output current $i_o$ flowing into the load circuit 16 changes due to the operational state.

The transistors 12 and 13 perform operations reverse to each other, with one being in a continuity state while the other being in an interruption state. Furthermore, the longer a period over which the transistor 12 is in a continuity state, the more the output voltage $V_o$ from the DC/DC converter. Switching between a continuity state and an interruption state in the transistors 12 and 13 is controlled with a pulse output from the PWM circuit 18. That is, the transistor 12 is in a continuity state during a period over which the pulse output from the PWM circuit 18 is in an ON state, and the transistor 13 is in a continuity state during a period over which the pulse is in an OFF state.

When a desired rectangular voltage is obtained through switching of the transistors 12 and 13, the voltage is rectified and smoothed by the coil 14 and the capacitor 15, and then the output voltage $V_o$ is output from the DC/DC converter. The output voltage $V_o$ is also input to the operational amplifier 17 provided to a feedback loop. In the operational amplifier 17, the output voltage $V_o$ and a reference voltage are differential-amplified, and a difference is then fed back to the PWM circuit 18.

The PWM circuit 18 adjusts a pulse width for switching between a continuity state and an interruption state of the transistors 12 and 13 according to the feedback from the operational amplifier 17, thereby controlling the continuity state and interruption state of the transistors 12 and 13. Specifically, when the output voltage $V_o$ is greater than the reference voltage and the difference output from the operational amplifier 17 is positive, the PWM circuit 18 decreases a duty ratio to shorten the period over which the transistor 12 is in a continuity state. On the other hand, if the output voltage $V_o$ is equal to or smaller than the reference voltage and the difference output from the operational amplifier 17 is negative, the PWM circuit 18 increases a duty ratio to extend the period over which the transistor 12 is in a continuity state.

With such feedback control, the duty ratio is adjusted so that the output voltage $V_o$ and the reference voltage always coincide with each other. As a result, even if the output current $i_o$ flowing through the load circuit 16 changes, the output voltage $V_o$ is always kept constant, thereby ensuring a voltage required for the load circuit 16 to operate. Such a conventional converter is exemplarily disclosed in Japanese Patent Application Laid-open No. 2000-227808.

However, in the load circuit to which the output voltage from the switching converter is supplied, when the current abruptly changes, feedback control in the switching converter cannot sufficiently follow this change, disadvantageously inviting a temporary decrease or increase of the output voltage. Specifically, for example, when the output current $i_o$ flowing through the load circuit 16 depicted in FIG. 14 abruptly changes, feedback control by the operational amplifier 17 and the PWM circuit 18 falls behind. With this, the output voltage $V_o$ may temporarily exceed an allowable range of the load circuit 16.

In particular, in recent years, a standby current flowing at the time of idling of the load circuit 16 tends to be reduced as much as possible in view of consideration to the terrestrial environment and others. For this reason, at the time of changing from an idling state to an operational state, the output current $i_o$ flowing through the load circuit 16 abruptly increases at a speed on the order of, for example, ten to several hundreds A/µS (amperes/microseconds). As a result, a delay in response of the operational amplifier 17 and the PWM circuit 18 depicted in FIG. 14 occurs, thereby temporarily decreasing the output voltage $V_o$.

That is, for example, as depicted in FIG. 15, when the output current $i_o$ abruptly changes, the output voltage $V_o$ decreases from a voltage $V_c$ to a voltage $V_c'$. At this time, when the voltage $V_c'$ falls short of an operating voltage of the load circuit 16, the load circuit 16 may fail to work properly or stop operation. Conversely, when the output current $i_o$ abruptly decreases, the output voltage $V_o$ temporarily increases, thereby causing an excessively-large voltage to be applied to the load circuit 16, leading to the occurrence of, for example, oscillation of an amplifier in the load circuit 16.

Normally, as for a change of the output current $i_o$, the capacitor 15 depicted in FIG. 14 has a function of supplying a current, thereby suppressing an increase or decrease of the output voltage $V_o$ with a charge stored in the capacitor 15 when the output current $i_o$ slightly changes. However, when the change amount of the output current $i_o$ is large, some measures have to be taken, such as increasing the capacity of the capacitor 15 or disposing many capacitors 15. Thus, if an abrupt and relatively-large change of the output current $i_o$ is taken into consideration, the circuitry size in the switching converter and cost thereof have to be disadvantageously increased.

SUMMARY

It is an object of the present invention to at least partially solve the problems in the conventional technology.

According to an aspect of an embodiment, a voltage converting device includes a converting unit that converts a power-supply voltage to an output voltage by switching between continuity and interruption of each of a plurality of switching elements according to a duty ratio indicative of a time ratio between a continuity time and an interruption time of the switching element; a measuring unit that measures an output current flowing through a load circuit to which the output voltage obtained through conversion by the converting unit is applied; a calculator that calculates a change speed of the output current measured by the measuring unit; and a determining unit that determines the duty ratio in the converting unit according to the change speed calculated by the calculator.

According to another aspect of an embodiment, a voltage converting method includes converting a power-supply voltage to an output voltage by switching between continuity and interruption of each of a plurality of switching elements according to a duty ratio indicative of a time ratio between a continuity time and an interruption time of the switching element; measuring an output current flowing through a load circuit to which the output voltage obtained through the converting is applied; calculating a change speed of the measured output current; and determining the duty ratio in the converting unit according to the calculated change speed.

According to still another aspect of an embodiment, a computer program product has a computer readable medium including programmed instructions for determining a duty ratio of a switching converter that converts a power-supply voltage to an output voltage to be applied to a load circuit by switching continuity and interruption of each of a plurality of switching elements according to a duty ratio indicative of a time ratio between a continuity time and an interruption time of the switching element. The instructions, when executed by a computer, cause the computer to perform obtaining a current value of an output current flowing through the load circuit to which the output voltage corresponding to the duty ratio is applied; calculating a change speed of the current value obtained; and newly determining a duty ratio according to the calculated change speed.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

Embodiments of the present invention are explained in detail below with reference to the drawings. In the following, as an example of a switching converter, a DC/DC converter connected to a direct-current power supply is explained. However, the present invention can be similarly applied to an AC/DC converter connected to an alternating-current power supply.

First Embodiment

Figure 1:
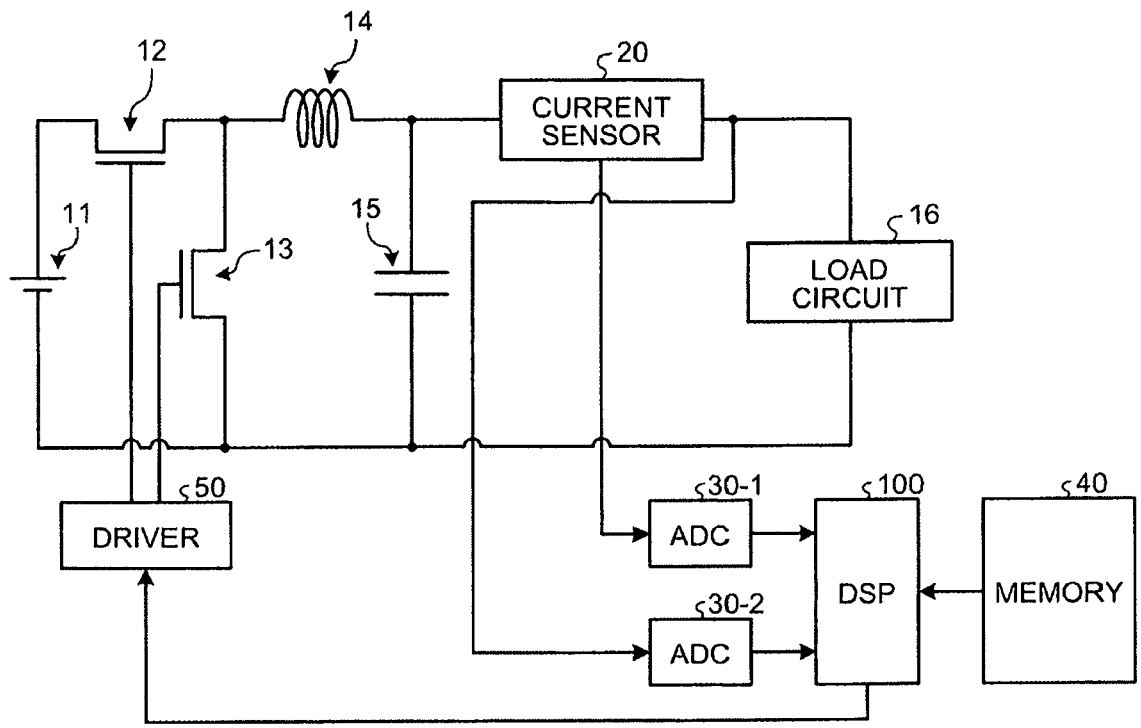
FIG. 1 is a drawing of a schematic configuration of a DC/DC converter according to a first embodiment.
Figure 14:
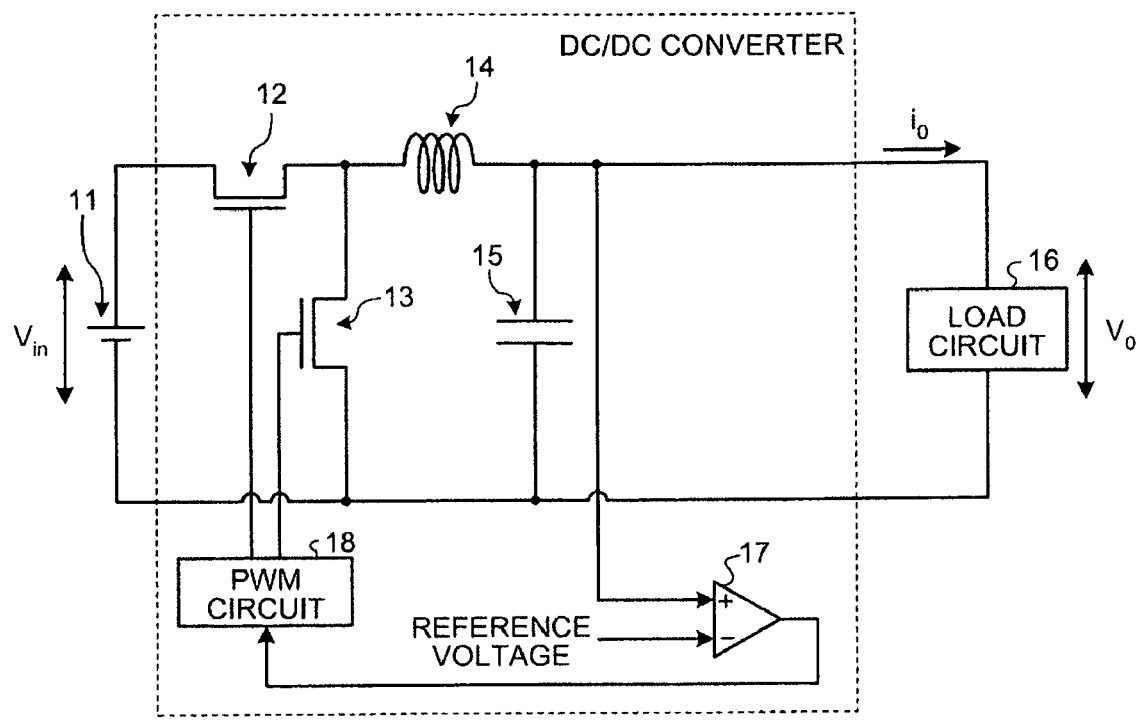
FIG. 14 is a drawing of an example of configuration of a DC/DC converter.
Figure 15:
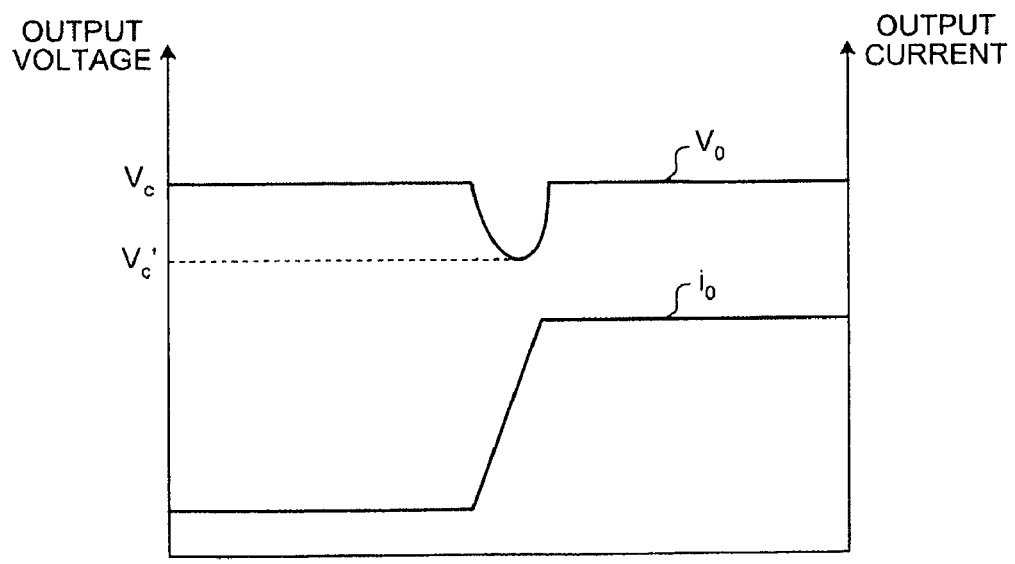
FIG. 15 is a drawing of an example of a relation between an output current and an output voltage.

FIG. 1 is a drawing of a schematic configuration of a DC/DC converter according to a first embodiment of the present invention. In the drawing, portions identical to those of the general DC/DC converter depicted in FIG. 14 are provided with the same reference numerals. The DC/DC converter depicted in FIG. 1 is a switching converter that converts a power-supply voltage of the DC power supply 11 to an output voltage to be applied to the load circuit 16. Specifically, the DC/DC converter includes the transistor 12, the transistor 13, the coil 14, the capacitor 15, a current sensor 20, an Analogue Digital Converter (ADC) 30-1, an ADC 30-2, a Digital Signal Processor (DSP) 100, a memory 40, and a driver 50.

The transistors 12 and 13 perform operations opposite to each other, with one being in a continuity state while the other being in an interruption state. Furthermore, the longer the time when the transistor 12 is in a continuity state, the more the output voltage from the DC/DC converter. Switching between a continuity state and an interruption state in the transistors 12 and 13 is controlled with a pulse output from the driver 50. That is, the transistor 12 is in a continuity state during a period over which the pulse output from the driver 50 is in an ON state, and the transistor 13 is in a continuity state during a period over which the pulse is in an OFF state. When a desired rectangular voltage is obtained through switching of the transistors 12 and 13, the coil 14 and the capacitor 15 rectify and smooth the voltage.

Here, the DC power supply 11 supplies a direct-current power supply to the load circuit 16 via the DC/DC converter. Also, the load circuit 16 is a circuit that performs various operations when the output voltage of the DC/DC converter is applied. The output voltage to be applied to the load circuit 16 is kept at a constant voltage greater than a predetermined operational voltage from DC/DC converter.

The current sensor 20 measures the output current output from the DC/DC converter to the load circuit 16, and then notifies the ADC 30-1 of the current value of the measured output current. Specifically, the current sensor 20 includes a resistive element with its resistance value being known, calculating an output current based on a voltage applied to the resistive element and the resistance value and then notifying the ACD 30-1 of the output current. Note that the current sensor 20 may include a Hall element in place of a resistive element. When a resistive element is used, the output current can be measured from a magnetic field, and therefore a voltage drop in the current sensor 20 can be prevented.

The ADC 30-1 converts the current value of the output current reported from the current sensor 20 to a digital signal. The ADC 30-1 then outputs the current value after conversion to the DSP 100. Similarly, the ADC 30-2 converts the voltage value of the output voltage output from the DC/DC converter to the load circuit 16 to a digital signal. The ADC 30-2 then outputs the voltage value after conversion to the DSP 100.

The memory 40 is a storage unit that stores various information for use by the DSP 100. As will be explained further below, for example, the memory 40 has stored therein a correction-amount table in which a change speed of the output current and a correction amount of the duty ratio of a pulse output from the driver 50 are associated with each other. The driver 50 outputs to the transistors 12 and 13 a pulse according to the duty ratio determined by the DSP 100 to control continuity and interruption of the transistors 12 and 13. Specifically, the driver 50 causes the transistor 12 to be in a continuity state during a period over which the pulse is in an ON state, whilst the driver 50 causes the transistor 13 to be in a continuity state during a period over which the pulse is in an OFF state. The duty ratio is a time ratio between ON and OFF of the pulse output from the driver 50. In the present embodiment, the duty ratio is determined by the DSP 100.

The DSP 100 determines the duty ratio of the pulse output from the driver 50 based on the current value output from the ADC 30-1 and the voltage value output from the ADC 30-2. That is, the DSP 100 performs feedback control so that the output voltage is always kept at a constant value and, when a change of the output current is abrupt more than a predetermined criterion, the DSP 100 further corrects the duty ratio corrected through feedback control.

Figure 2:
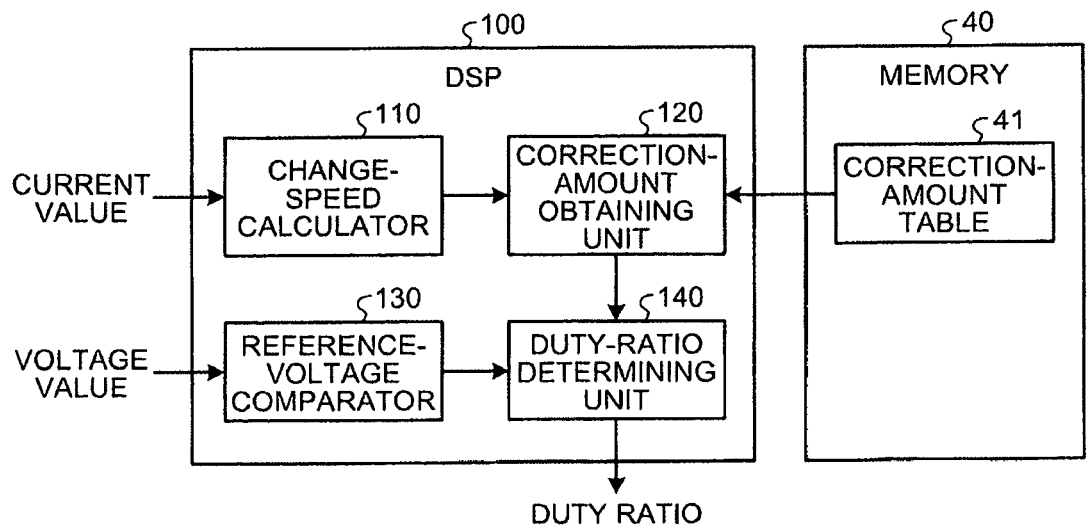
FIG. 2 is a block diagram of an internal configuration of a Digital Signal Processor (DSP) according to the first embodiment.

Specifically, an internal configuration of the DSP 100 is as depicted in FIG. 2. That is, the DSP 100 includes a changing-speed calculator 110, a correction-amount obtaining unit 120, a reference-voltage comparator 130, and a duty-ratio determining unit 140. Also, the memory 40 stores a correction-amount table 41.

The changing-speed calculator 110 monitors the current value output from the ADC 30-1 to calculate a change speed of the current value. When the change speed calculated by the changing-speed calculator 110 is greater than a predetermined threshold speed, the output voltage from the DC/DC converter is considered to abruptly decrease or increase. Therefore, there is a possibility that feedback control may not follow the increase or decrease of the output voltage.

The correction-amount obtaining unit 120 reads from the correction-amount table 41 a correction amount of the duty ratio corresponding to the change speed calculated by the changing-speed calculator 110, and then outputs the read correction amount to the duty-ratio determining unit 140. That is, the correction-amount obtaining unit 120 obtains a correction amount corresponding to the change speed of the output current for the duty ratio that cannot be sufficiently corrected only through feedback control over the output voltage.

The reference-voltage comparator 130 compares the voltage value output from the ADC 30-2 and the voltage value of a predetermined reference voltage with each other, and then notifies the duty-ratio determining unit 140 of the comparison result. At this time, as the reference voltage, the reference-voltage comparator 130 uses the voltage value corresponding to the output voltage to be supplied to the load circuit 16. Therefore, this means that the reference-voltage comparator 130 determines whether the voltage required for the load circuit 16 is being appropriately output from the DC/DC converter.

The duty-ratio determining unit 140 corrects the duty ratio according to the comparison result of the voltage values reported from the reference-voltage comparator 130. That is, when the output voltage and the reference voltage are equal to each other, the output voltage of the DC/DC converter has an appropriate voltage value, and therefore the duty-ratio determining unit 140 does not change the duty ratio based on the comparison result of the voltage values. When the output voltage decreases to be equal to or smaller than the reference voltage, the output voltage is required to be increased, and therefore the duty-ratio determining unit 140 corrects the duty ratio so that the period over which the transistor 12 is in a continuity state is extended. Conversely, when the output voltage increases to exceed the reference voltage, the output voltage is required to be decreased, and therefore the duty-ratio determining unit 140 corrects the duty ratio so that the period over which the transistor 12 is in a continuity state is shortened.

Furthermore, after correcting the duty ratio according to the comparison result between the output voltage and the reference voltage, the duty-ratio determining unit 140 corrects the duty ratio by the correction amount obtained by the correction-amount obtaining unit 120. That is, the duty-ratio determining unit 140 corrects the duty ratio by performing feedback control so that the output voltage is equal to the reference voltage, and also corrects the duty ratio according to the change speed of the output current. Therefore, even if the output voltage and the reference voltage are equal to each other, when it is considered that the change speed of the output current is so large as to cause the output voltage to decrease or increase, the duty-ratio determining unit 140 corrects the duty ratio so as to prevent a decrease or increase of the output voltage.

Figure 3:
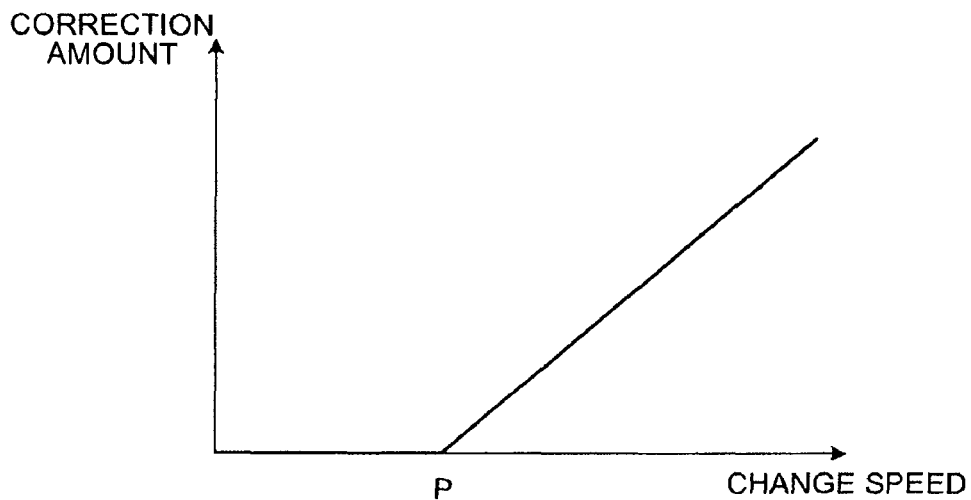
FIG. 3 is a drawing of one example of a correction-amount table according to the first embodiment.

The correction-amount table 41 retains a correction amount of the duty ratio corresponding to a change speed of the output current. Specifically, the correction-amount table 41 retains 0 as a correction amount of the duty ratio for a change speed equal to or smaller than a threshold speed. For a change speed greater than the threshold speed, the correction-amount table 41 retains a correction amount according to the magnitude of the change speed. That is, as depicted in FIG. 3, for example, the correction-amount table 41 retains 0 as a correction amount corresponding to change speeds up to a threshold speed P and, as correction amounts corresponding to respective change speeds exceeding the threshold speed P, the correction-amount table 41 retains values according to the respective change speeds. Therefore, when the change speed of the output current is equal to or smaller than the threshold speed P, the duty ratio is not corrected.

Note that FIG. 3 depicts only the magnitude of the correction amount corresponding to the change speed of the output current. Therefore, for actual correction of the duty ratio, a correction amount corresponding to the change speed is added or subtracted. Specifically, when the output current abruptly increases, the duty-ratio determining unit 140 adds a correction amount to the duty ratio corrected through feedback control. With this, the duty ratio is corrected so that the period over which the transistor 12 is in a continuity state is extended, thereby preventing a drop in output voltage. On the other hand, when the output current abruptly decreases, the duty-ratio determining unit 140 subtracts a correction amount from the duty ratio corrected through feedback control. With this, the duty ratio is corrected so that the period over which the transistor 12 is in a continuity state is shortened, thereby preventing an increase in output voltage.

Figure 4:
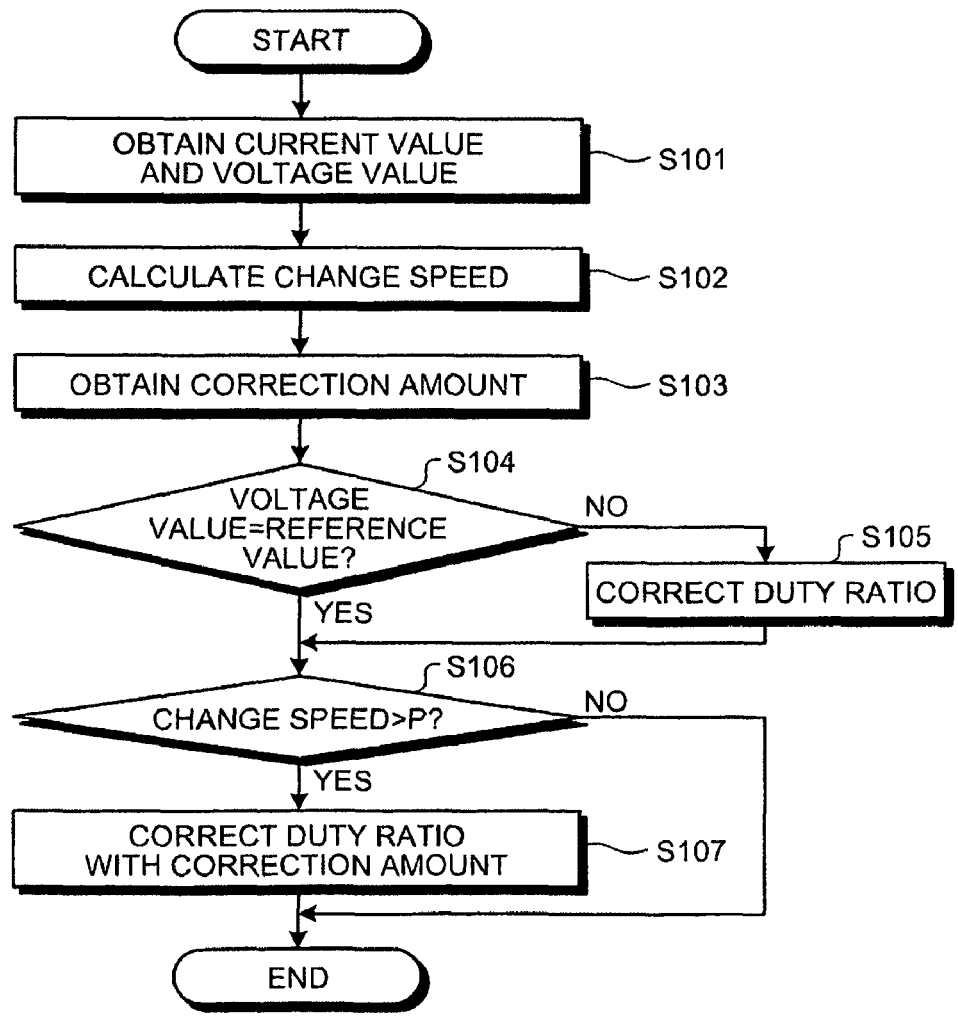
FIG. 4 is a flow diagram of a voltage converting method according to the first embodiment.

Next, a voltage converting method in the above-configured DC/DC converter is explained with reference to a flow diagram depicted in FIG. 4. The flow diagram in FIG. 4 mainly depicts a process of the DSP 100.

When the transistors 12 and 13 are switched according to the pulse output from the driver 50, the power-supply voltage from the DC power supply 11 is converted to an output voltage according to the duty ratio of the pulse. After rectified and smoothed by the coil 14 and the capacitor 15, the output voltage is applied to the load circuit 16.

At this time, the output current in association with the output voltage is measured by the current sensor 20, and the measured current value is then converted by the ADC 30-1 to a digital signal. Also, the voltage value of the output voltage is converted by the ADC 30-2 to a digital signal. The current value of the output current and the voltage value of the output voltage converted to digital signals are obtained by the DSP 100 (Step S101). That is, the current value of the output current is input to the changing-speed calculator 110, whilst the voltage value of the output voltage is input to the reference-voltage comparator 130.

Then, a change speed of the output current is calculated by the changing-speed calculator 110 (Step S102). In other words, the current value of the output current is monitored by the changing-speed calculator 110, and a change speed serving as an index indicative of whether the output current abruptly changes is calculated. It is assumed herein that feedback control cannot follow an increase or decrease of the output voltage when the change speed of the output current is greater than the threshold speed P.

The change speed calculated by the changing-speed calculator 110 is output to the correction-amount obtaining unit 120. A correction amount corresponding to the change speed is then obtained by the correction-amount obtaining unit 120 from the correction-amount table 41 (Step S103). That is, when the change speed of the output current is equal to or smaller than the threshold speed P, 0 is obtained by the correction-amount obtaining unit 120 as a correction amount of the duty ratio. Also, when the change speed of the output current is greater than the threshold speed P, a correction amount of the duty ratio according to the change speed is obtained by the correction-amount obtaining unit 120. The correction amount of the duty ratio obtained by the correction-amount obtaining unit 120 is then output to the duty-ratio determining unit 140.

On the other hand, when the voltage value of the output voltage is input to the reference-voltage comparator 130, the output voltage and the reference voltage are compared with each other by the reference-voltage comparator 130 (Step S104). Here, the voltage value of the reference voltage corresponds to a voltage value to be supplied to the load circuit 16. Therefore, when the output voltage and the reference voltage are equal to each other, this means that the output voltage of the DC/DC converter is appropriate. Therefore, when the output voltage and the reference voltage are equal to each other ("Yes" at Step S104), the duty-ratio determining unit 140 is notified by the reference-voltage comparator 130 of the comparison result indicating as such, and the duty ratio is not corrected based on the output voltage.

Conversely, when the output voltage and the reference voltage are not equal to each other ("No" at Step S104), the duty-ratio determining unit 140 is notified by the reference-voltage comparator 130 of the comparison result including a difference between the output voltage and the reference voltage, and the duty ratio is corrected so that the difference between the output voltage and the reference voltage is made equal to 0 (Step S105). That is, when the output voltage is equal to or smaller than the reference voltage, the duty ratio is corrected by the duty-ratio determining unit 140 so that the period over which the transistor 12 is in a continuity state is extended. When the output voltage is greater than the reference voltage, the duty ratio is corrected by the duty-ratio determining unit 140 so that the period over which the transistor 12 is in a continuity state is shortened.

The process explained above is feedback control over the output voltage, correcting the duty ratio so that the output voltage is equal to the reference voltage when the output voltage actually becomes smaller or greater than the reference voltage. However, when the output current flowing through the load circuit 16 abruptly changes, the output voltage falls behind even if the duty ratio is corrected through feedback control after the output voltage actually changes, decreasing or increasing to a voltage value outside of an allowable range of the load circuit 16. To get around this problem, in the present embodiment, as explained above, the correction amount corresponding to the change speed of the output current is obtained by the correction-amount obtaining unit 120, and the obtained correction amount is then output to the duty-ratio determining unit 140.

The correction amount of the duty ratio output from the correction-amount obtaining unit 120 varies, either a value according to the change speed or 0, depending on whether the change speed of the output current is greater than the threshold speed P. Therefore, depending on whether the change speed of the output current is greater than the threshold speed P, the method of determining the duty ratio by the duty-ratio determining unit 140 varies (Step S106). That is, when the change speed is equal to or smaller than the threshold speed P ("No" at Step S106), the correction amount output from the correction-amount obtaining unit 120 is 0, and therefore the duty ratio is determined only through feedback control based on the comparison between the output voltage and the reference voltage.

Conversely, when the change speed is greater than the threshold speed P ("Yes" at Step S106), the correction amount output from the correction-amount obtaining unit 120 has a value according to the change speed. Therefore, the duty ratio corrected through feedback control is further corrected by the correction amount (Step S107). That is, when the change speed of the output current is greater than the threshold speed P and the output current abruptly changes, the duty ratio is corrected besides feedback control based on the comparison between the output voltage and the reference voltage. Specifically, when the output current abruptly increases, the duty ratio is corrected by the duty-ratio determining unit 140 so that the period over which the transistor 12 is in a continuity state is extended. When the output current abruptly decreases, the duty ratio is corrected by the duty-ratio determining unit 140 so that the period over which the transistor 12 is in a continuity state is shortened.

As a result, even if the output voltage and the reference voltage are equal to each other and the duty ratio has not been corrected by the duty-ratio determining unit 140 through feedback control, the duty ratio is corrected when the output current abruptly changes. Therefore, even when the output current abruptly changes to a degree such that feedback control cannot follow an increase or decrease of the output voltage, the output voltage can be kept constant, thereby reliably supplying the load circuit 16 with a voltage within an allowable range. Also, for the process explained above, the current sensor 20, the ADC 30-1, the ADC 30-2, the DSP 100, and the memory 40 are newly added to the DC/DC converter. However, such an increase in circuitry size is small in comparison with the case of adding a large-capacity capacitor to the DC/DC converter. With this, the output voltage can be kept constant while suppressing an increase in circuitry size and cost.

Figure 5A:
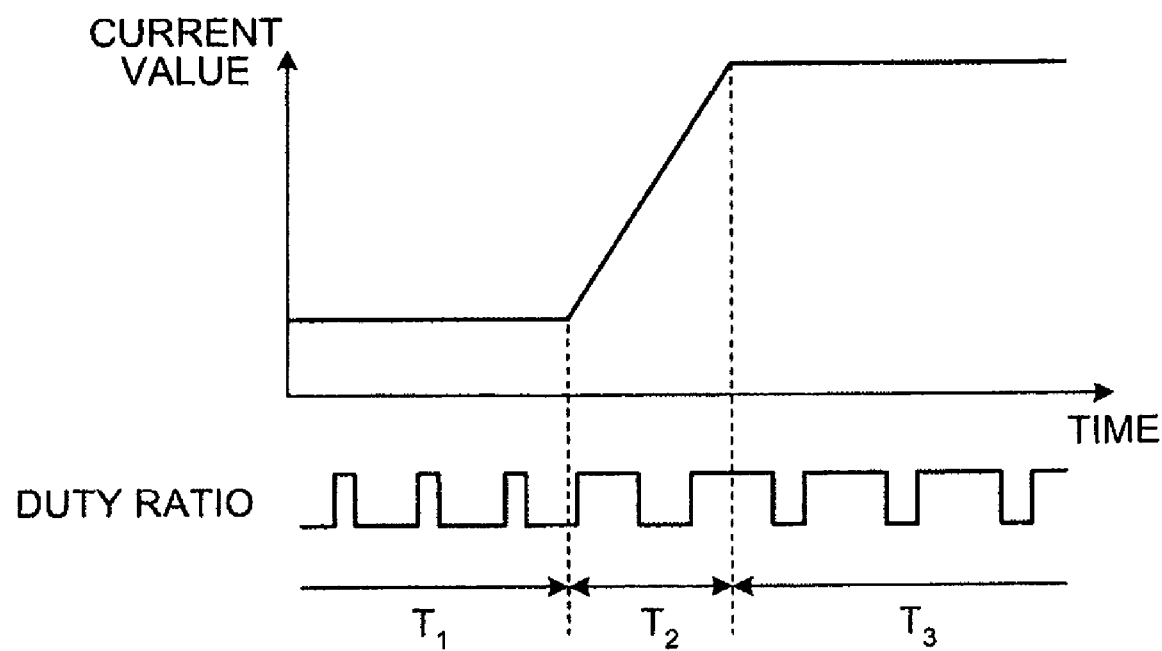
FIG. 5A depicts changes in duty ratio when an output current abruptly increases in the first embodiment.
Figure 5B:
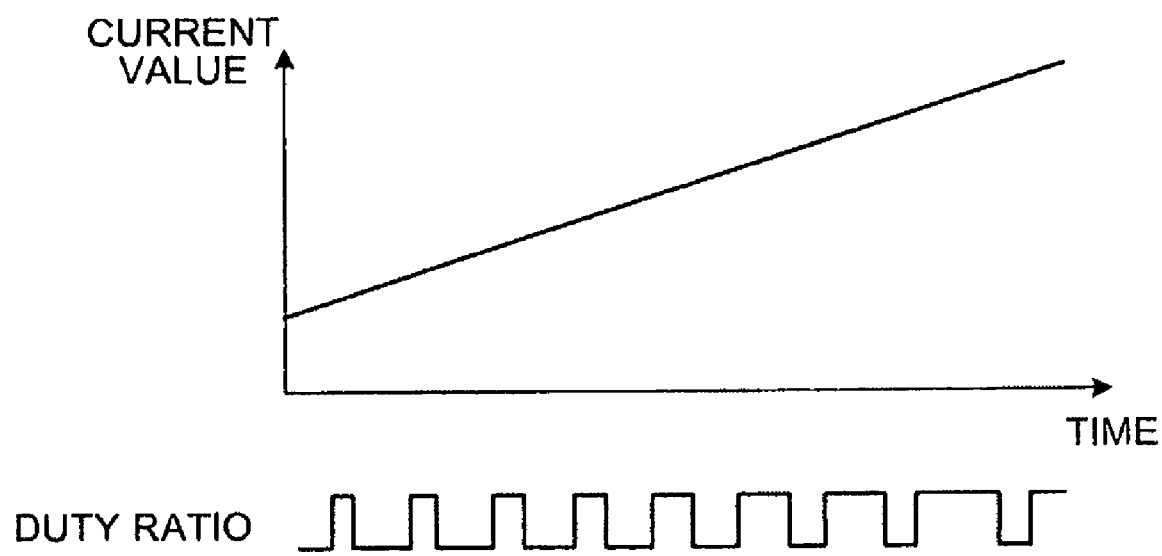
FIG. 5B depicts changes in duty ratio when an output current mildly increases in the first embodiment.

Next, changes in duty ratio when the change speed of the output current is greater than the threshold speed P and when it is equal to or smaller than the threshold speed P are explained with reference to FIGS. 5A and 5B, which are drawings of an example of changes in duty ratio according to the first embodiment. FIG. 5A depicts changes in duty ratio when the output current abruptly increases; FIG. 5B depicts changes in duty ratio when the output current mildly increases.

As depicted in FIG. 5A, when the output current abruptly increases during a time $T_2$, the change speed of the output current is greater than the threshold speed P, and therefore the duty ratio is corrected with the correction amount obtained from the correction-amount table 41. Specifically, since the output current is constant during a time $T_1$, the change speed of the output current is equal to or smaller than the threshold speed P, and the correction amount input to the duty-ratio determining unit 140 is 0. Therefore, at the time $T_1$, the duty-ratio determining unit 140 only performs feedback control according to the comparison result between the output voltage and the reference voltage by the reference-voltage comparator 130.

On the other hand, during the time $T_2$, the output current abruptly increases and the change speed becomes greater than the threshold speed P. Therefore, a correction amount for extending the period over which the transistor 12 is in a continuity state is obtained by the correction-amount obtaining unit 120, and is then input to the duty-ratio determining unit 140. Thus, during the time $T_2$, the duty-ratio determining unit 140 performs correction by adding the correction amount to the duty ratio after correction through feedback control. For this reason, when the duty ratio during the time $T_1$ and the duty ratio during the time $T_2$ are compared with each other, a pulse width corresponding to the period over which the transistor 12 is in a continuity state abruptly increases at the start of the time $T_2$. That is, the duty ratio is corrected on the assumption of a decrease of the output voltage before the output voltage actually decreases in association with an increase of the output current. With this, even when the output current abruptly increases, the output voltage can be kept constant without decreasing.

Note that, once adjusting the duty ratio, the duty-ratio determining unit 140 keeps the adjusted duty ratio until adjustment is required next. Therefore, once correcting the duty ratio at the start of the time $T_2$, the duty-ratio determining unit 140 corrects the duty ratio through feedback control or according to the change speed of the output current.

Then, since the output current becomes constant again during a time $T_3$, the change speed of the output current is equal to or smaller than the threshold speed P, and the correction amount input to the duty-ratio determining unit 140 is 0. Therefore, during the time $T_3$, the duty-ratio determining unit 140 only performs feedback control according to the comparison result between the output voltage and the reference voltage by the reference-voltage comparator 130. At this time, as explained above, the duty-ratio determining unit 140 keeps the once-adjusted duty ratio, and therefore the duty ratio after correction during the time $T_2$ is kept, and the duty ratio does not abruptly change at the start of the time $T_3$. With the duty ratio being kept, the output current during the time $T_3$ is greater than that during the time $T_1$, but the output voltage is kept constant.

On the other hand, as depicted in FIG. 5B, when the output current mildly increases, the change speed of the output current is equal to or smaller than the threshold speed P, and the correction amount obtained from the correction-amount table 41 is 0. That is, since the output current mildly changes, the correction amount input to the duty-ratio determining unit 140 is 0. Therefore, the duty-ratio determining unit 140 does not correct the duty ratio based on the change speed of the output current, but only performs feedback control according to the comparison result between the output voltage and the reference voltage by the reference-voltage comparator 130. With this, in FIG. 5B, as the output voltage gradually increases, the period over which the transistor 12 is in a continuity state is gradually extended.

As such, when the output current mildly changes, the correction amount output from the correction-amount obtaining unit 120 to the duty-ratio determining unit 140 is 0. Therefore, the duty-ratio determining unit 140 only performs feedback control according to the comparison result from the reference-voltage comparator 130. However, since the change of the output current is mild and the output voltage does not abruptly change, feedback control can sufficiently follow the change, thereby keeping the output voltage constant.

As explained above, according to the present embodiment, the output current of the DC/DC converter flowing to the load circuit is measured. When the change speed of the output current becomes greater than the threshold speed, the duty ratio corrected through feedback control over the output voltage is further corrected. With this, the duty ratio can be determined on the assumption in advance of an increase or decrease of the output voltage in association with an abrupt change of the output current. In other words, the duty ratio can follow changes of the output current and the output voltage even without providing an additional circuit, such as a large-capacity capacitor, thereby keeping the output voltage constant while suppressing an increase in circuitry size and cost.

Second Embodiment

A feature of a second embodiment in the present invention is that a loop gain of a feedback loop for feedback control is adjusted when the change speed of the output current is greater than the threshold speed and, even when a difference between the output voltage and the reference voltage is small, the duty ratio is corrected more than usual.

A schematic configuration of a DC/DC converter according to the present embodiment is similar to that in the first embodiment (FIG. 1), and therefore is not explained herein. However, the DC/DC converter according to the present embodiment is configured to include a DSP 200 in place of the DSP 100 according to the first embodiment.

Figure 6:
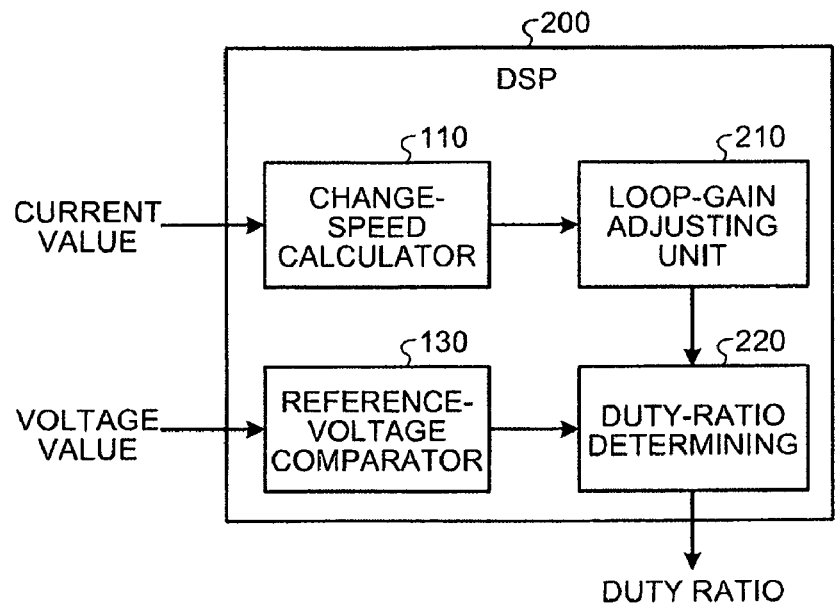
FIG. 6 is a block diagram of an internal configuration of a DSP according to a second embodiment.

FIG. 6 is a block diagram of an internal configuration of the DSP 200 according to the present embodiment. In the drawing, portions identical to those in FIG. 2 are provided with the same reference numerals, and are not explained herein. The DSP 200 depicted in FIG. 6 includes a loop-gain adjusting unit 210 and a duty-ratio determining unit 220 in place of the correction-amount obtaining unit 120 and the duty-ratio determining unit 140 of the DSP 100 depicted in FIG. 2.

The loop-gain adjusting unit 210 compares the change speed calculated by the changing-speed calculator 110 and a predetermined threshold speed and, when the change speed is greater than the predetermined threshold speed, increase a gain (loop gain) of feedback control in the duty-ratio determining unit 220. That is, when the output current abruptly changes, the loop-gain adjusting unit 210 increases a loop gain so that feedback control is more responsive to even a subtle change of the output voltage. At this time, the loop-gain adjusting unit 210 may increase a loop gain by a predetermined amount or by an amount according to the change speed of the output current.

The duty-ratio determining unit 220 corrects the duty ratio according to the comparison result of the voltage values reported from the reference-voltage comparator 130. That is, when the output voltage and the reference voltage are equal to each other, the duty-ratio determining unit 220 does not change the duty ratio based on the comparison result of the voltage values. Also, when the output voltage decreases below the reference voltage, the output voltage is required to be increased, and therefore the duty-ratio determining unit 220 corrects the duty ratio so that the period over which the transistor 12 is in a continuity state is extended. Conversely, when the output voltage increases above the reference voltage, the output voltage is required to be decreased, and therefore the duty-ratio determining unit 220 corrects the duty ratio so that the period over which the transistor 12 is in a continuity state is shortened.

At this time, the duty-ratio determining unit 220 corrects the duty ratio by an amount obtained by multiplying the difference between the output voltage and the reference voltage by the loop gain. Therefore, as the loop gain is larger, the duty-ratio determining unit 220 changes the duty ratio more even when the difference between the output voltage and the reference voltage is subtle. In other words, when the loop gain is adjusted to be increased by the loop-gain adjusting unit 210, the duty-ratio determining unit 220 increases responsiveness of feedback control more than usual.

Figure 7:
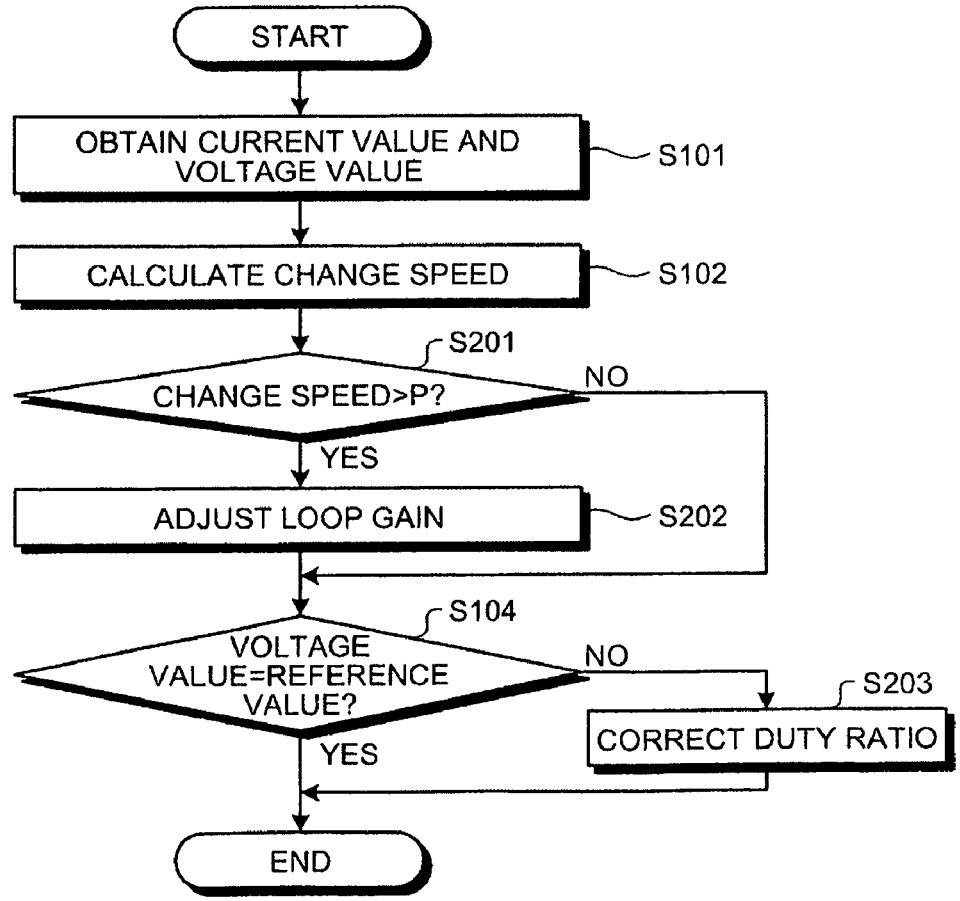
FIG. 7 is a flow diagram of a voltage converting method according to the second embodiment.

Next, a voltage converting method in the DC/DC converter is explained with reference to a flow diagram depicted in FIG. 7. The flow diagram in FIG. 7 mainly depicts a process of the DSP 200. In the drawing, portions identical to those in FIG. 4 are provided with the same reference numerals, and are not explained in detail herein.

When the transistors 12 and 13 are switched according to the pulse output from the driver 50, the power-supply voltage from the DC power supply 11 is converted to an output voltage according to the duty ratio of the pulse. After rectified and smoothed by the coil 14 and the capacitor 15, the output voltage is applied to the load circuit 16.

At this time, the output current in association with the output voltage is measured by the current sensor 20, and the measured current value is then converted by the ADC 30-1 to a digital signal. Also, the voltage value of the output voltage is converted by the ADC 30-2 to a digital signal. The current value of the output current and the voltage value of the output voltage converted to digital signals are obtained by the changing-speed calculator 110 and the reference-voltage comparator 130 (Step S101). Then, a change speed of the output current is calculated by the changing-speed calculator 110 (Step S102). It is assumed herein that feedback control cannot follow an increase or decrease of the output voltage when the change speed of the output current is greater than the threshold speed P.

The change speed calculated by the changing-speed calculator 110 is output to the loop-gain adjusting unit 210. Whether the change speed is greater than the threshold speed P is then determined by the loop-gain adjusting unit 210 (Step S201). As explained above, since feedback control cannot follow the change when the change speed is greater than the threshold speed P, this determination is to determine whether feedback control cannot follow an increase or decrease of the output voltage to make the output voltage inconstant.

When it is determined that the change speed is greater than the threshold speed P ("Yes" at Step S201), the loop-gain adjusting unit 210 adjust the gain of feedback control in the duty-ratio determining unit 220 so that the gain is increased (Step S202). With this, the loop gain of the feedback loop for feedback control over the output voltage is increased, thereby correcting the duty ratio more even when the difference between the output voltage and the reference voltage is subtle.

On the other hand, when the change speed of the output current is equal to or smaller than the threshold speed P ("No" at Step S201), the loop gain of the feedback loop is not adjusted by the loop-gain adjusting unit 210. Therefore, in this case, when the difference between the output voltage and the reference voltage is subtle, the duty ratio is also corrected slightly.

When the voltage value of the output voltage is input to the reference-voltage comparator 130, the output voltage and the reference voltage are compared with each other by the reference-voltage comparator 130 (Step S104). As a result of comparison, when the output voltage and the reference voltage are equal to each other ("Yes" at Step S104), the reference-voltage comparator 130 notifies the duty-ratio determining unit 220 of the comparison result indicating as such, and the duty ratio is not corrected based on the output voltage.

Conversely, when the output voltage and the reference voltage are not equal to each other ("No" at Step S104), the reference-voltage comparator 130 notifies the duty-ratio determining unit 220 of the comparison result including a difference between the output voltage and the reference voltage, and then the duty ratio is corrected by an amount obtained by multiplying the difference of the voltage values by the loop gain (Step S203). That is, if the loop gain has not been adjusted by the loop-gain adjusting unit 210, the duty ratio is corrected according to the difference between the output voltage and the reference voltage. If the loop gain has been adjusted by the loop-gain adjusting unit 210, the duty ratio is corrected with the difference between the output voltage and the reference voltage being taken as being greater than the actual difference.

Therefore, if the loop gain has been adjusted, the duty ratio is corrected similarly to the case where the difference is large, even when the difference between the output voltage and the reference voltage is subtle. With this, feedback control becomes more responsive. Here, the loop gain is adjusted when the change speed of the output current is greater than the threshold speed P. Therefore, when the output current abruptly changes, feedback control is more responsive to the change than to the actual increase or decrease of the output voltage. Thus, when the output voltage increases or decreases in association with an abrupt change of the output current, the duty ratio is corrected more even when the output voltage slightly changes. As a result, the duty ratio is corrected on the assumption of a large increase or decrease of the output voltage in association with an abrupt change of the output current, thereby suppressing a delay in feedback control with respect to an increase or decrease of the output voltage.

As explained above, according to the present embodiment, the output current of the DC/DC converter flowing to the load circuit is measured. When the change speed of the output current becomes greater than the threshold speed, the loop gain in feedback control over the output voltage is further corrected. With this, when the output voltage changes abruptly, feedback control becomes more responsive to an increase or decrease of the output voltage, and the duty ratio can be determined on the assumption in advance of an increase or decrease of the output voltage in association with an abrupt change of the output current. In other words, the duty ratio can follow changes of the output current and the output voltage even without providing an additional circuit, such as a large-capacity capacitor, thereby keeping the output voltage constant while suppressing an increase in circuitry size and cost.

Third Embodiment

A feature of a third embodiment in the present invention is that feedback control is performed by using an analog circuit and the duty ratio is corrected according to the change speed of the output current.

Figure 8:
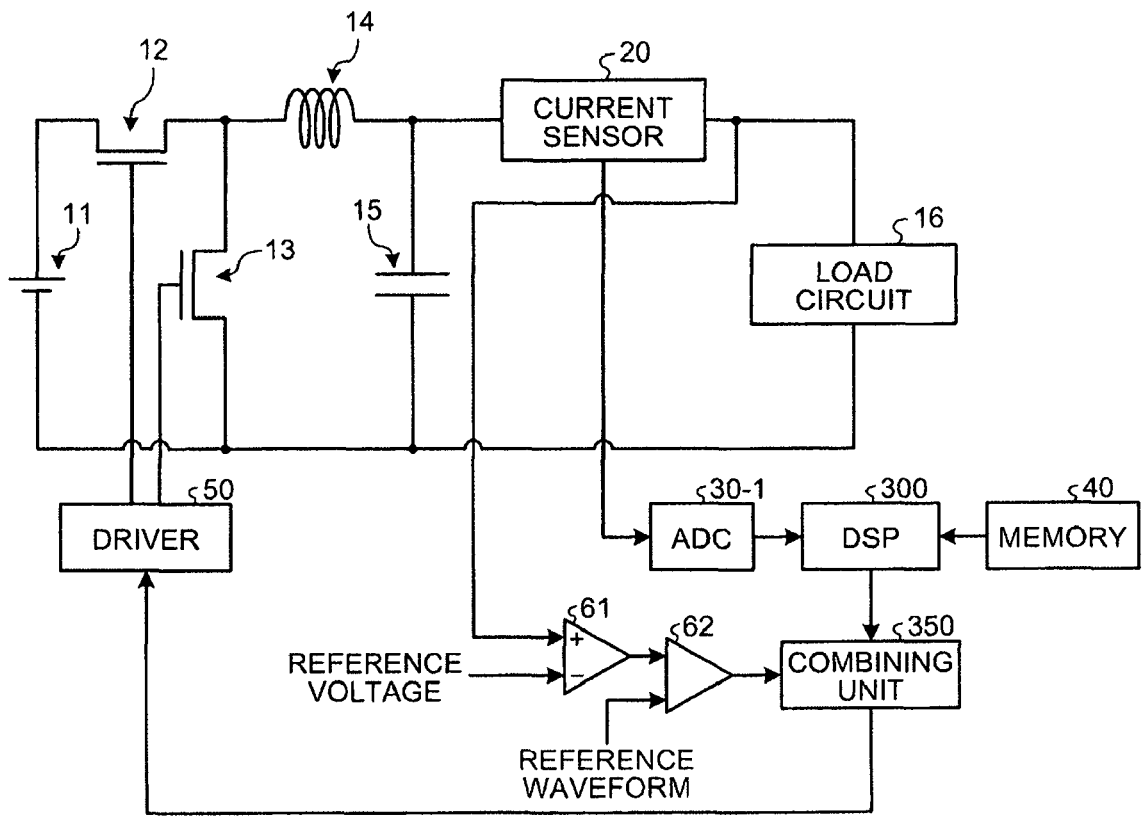
FIG. 8 is a drawing of a schematic configuration of a DC/DC converter according to a third embodiment.

FIG. 8 is a drawing of a schematic configuration of a DC/DC converter according to the present embodiment. In the drawing, portions identical to those in FIGS. 1 and 14 are provided with the same reference numerals, and are not explained herein. The DC/DC converter depicted in FIG. 8 is a switching converter that converts a power-supply voltage of the DC power supply 11 to an output voltage to be applied to the load circuit 16. Specifically, the DC/DC converter depicted in FIG. 8 includes an operational amplifier 61, a comparator 62, a DSP 300, and a combining unit 350 in place of the ADC 30-2 and the DSP 100 of the DC/DC converter depicted in FIG. 1.

The operational amplifier 61 is a differential amplifier that differential-amplifies the output voltage of the DC/DC converter to be applied to the load circuit 16 and the reference voltage, outputting a difference between the output voltage and the reference voltage obtained through differential amplification to the comparator 62. The comparator 62 corrects the duty ratio by comparing the difference output from the operational amplifier 61 and a reference waveform for pulse generation, and outputs the duty ratio after correction to the combining unit 350. In other words, the operational amplifier 61 and the comparator 62 perform feedback control for correcting the duty ratio based on the comparison between the output voltage and the reference voltage.

Figure 9:
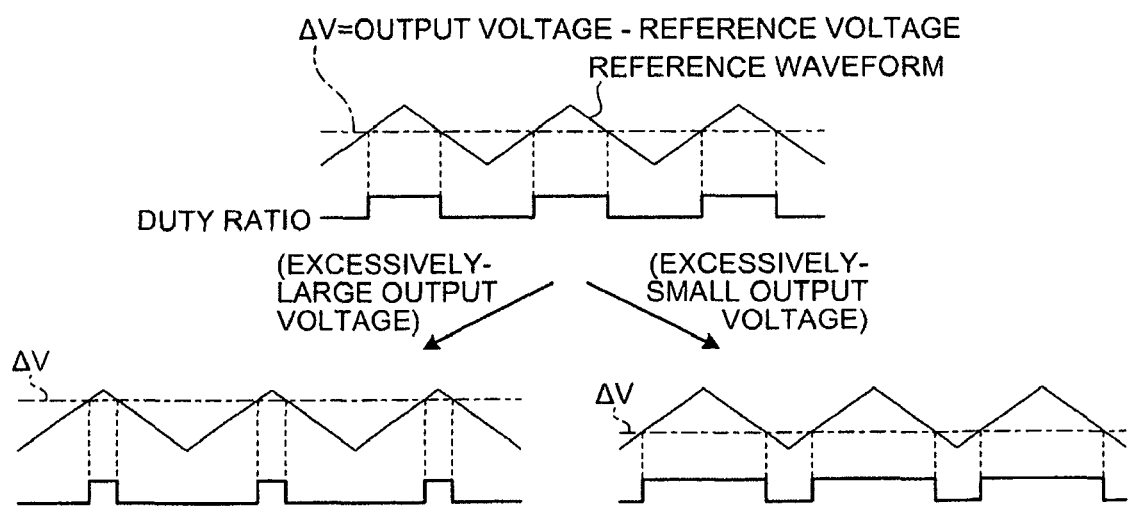
FIG. 9 is a drawing of an example of duty-ratio correction according to output voltage.

Here, correction of the duty ratio by the operational amplifier 61 and the comparator 62 is explained with reference to FIG. 9. An upper part in FIG. 9 depicts a duty ratio when the output voltage and the reference voltage is equal to each other, and a difference $\Delta V$ between the output voltage and the reference voltage output from the operational amplifier 61 is 0. In this case, the difference $\Delta V$ is compared by the comparator 62 with the reference waveform, such as a triangular wave or a sawtooth wave. The duty ratio is such that a period over which the level of the reference waveform is above the difference $\Delta V$ corresponds to an ON state of the pulse, whilst a period over which the level of the reference waveform is below the difference $\Delta V$ corresponds to an OFF state of the pulse.

From this state, when the output voltage becomes excessively large, for example, the difference $\Delta V$ output from the operational amplifier 61 becomes greater than 0. Therefore, as depicted in a lower-left part in FIG. 9, the difference $\Delta V$ moves in a maximum level direction of the reference waveform, and a period over which the level of the reference waveform is above the difference $\Delta V$ is shortened. As a result, a period over which the pulse is in an ON state is shortened, thereby shortening a period over which the transistor 12 is in a continuity state is shortened, thereby decreasing the excessively-large output voltage.

Similarly, when the output voltage becomes excessively small, for example, the difference $\Delta V$ output from the operational amplifier 61 becomes smaller than 0. Therefore, as depicted in a lower-right part in FIG. 9, the difference $\Delta V$ moves in a minimum level direction of the reference waveform, and a period over which the level of the reference waveform is above the difference $\Delta V$ is extended. As a result, a period over which the pulse is in an ON state is extended, thereby extending a period over which the transistor 12 is in a continuity state is extended, thereby increasing the excessively-small output voltage.

Referring back to FIG. 8, the DSP 300 obtains from the memory 40 a correction amount of the duty ratio corresponding to the change speed of the current value output from the ADC 30-1, and then outputs the obtained correction amount to the combining unit 350. That is, when a change of the output current is abrupt more than a predetermined criterion, the DSP 300 obtains a correction amount for the duty ratio feedback-controlled by the operational amplifier 61 and the comparator 62.

Figure 10:
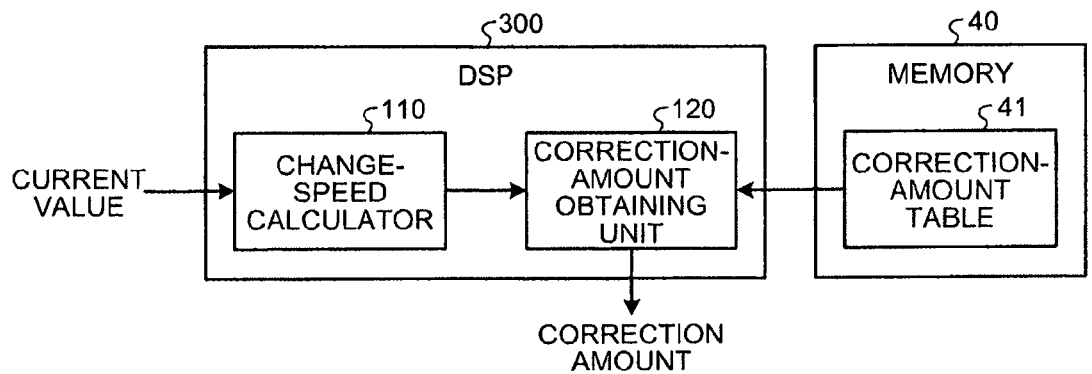
FIG. 10 is a block diagram of an internal configuration of a DSP according to the third embodiment.

Specifically, an internal configuration of the DSP 300 is as depicted in FIG. 10. In the drawing, portions identical to those in FIG. 2 are provided with the same reference numerals. As depicted in FIG. 10, the DSP 300 includes only the changing-speed calculator 110 and the correction-amount obtaining unit 120 in the DSP 100 depicted in FIG. 2. Also, as with FIG. 2, the memory 40 stores the correction-amount table 41. The changing-speed calculator 110 and the correction-amount obtaining unit 120 depicted in FIG. 10 perform a process similar to that of the changing-speed calculator 110 and the correction-amount obtaining unit 120 depicted in FIG. 2. That is, the changing-speed calculator 110 monitors the current value output from the ADC 30-1 to calculate a change speed of the current value. The correction-amount obtaining unit 120 reads from the correction-amount table 41 a correction amount of the duty ratio corresponding to the change speed of the output current, and then outputs the read correction amount to the combining unit 350.

Referring again back to FIG. 8, the combining unit 350 combines the duty ratio output from the comparator 62 with the correction amount output from the DSP 300, thereby determining the final duty ratio to be reported to the driver 50. That is, the combining unit 350 further corrects the duty ratio corrected through feedback control by the correction amount corresponding to the change speed of the output current.

In the present embodiment, with an analog circuit including the operational amplifier 61 and the comparator 62, feedback control over the output voltage is performed by comparing the output voltage and the reference voltage with each other. At the same time, digital signal processing is performed by the DSP 300 based on the output current. That is, with the digital signal processing by the DSP 300, the correction amount of the duty ratio corresponding to the change speed of the output current is obtained, and the feedback control result output from the comparator 62 and the correction amount output from the DSP 300 are combined together by the combining unit 350. At this time, the feedback control result output from the comparator 62 is an analog output, whilst the correction amount output from the DSP 300 is a digital output. Therefore, the combining unit 350 may include, for example, an ADC not shown that converts the feedback control result output from the comparator 62 to a digital signal.

With the above-configured DC/DC converter, feedback control by the operational amplifier 61 and the comparator 62 can be performed for the output voltage, and also the duty ratio can be corrected based on the change speed of the output current. When the change speed of the output current is greater than the predetermined threshold speed, the duty ratio corrected through feedback control by the analog circuit is further corrected.

As result, even if the output voltage and the reference voltage are equal to each other and the duty ratio is not corrected by the comparator 62, the duty ratio is corrected when the output current abruptly changes. Therefore, even when the output current abruptly changes to a degree such that feedback control cannot follow an increase or decrease of the output voltage, the output voltage can be kept constant, thereby reliably supplying the load circuit 16 with a voltage within an allowable range. Also, for the process explained above, the current sensor 20, the ADC 30-1, the DSP 300, and the memory 40 are newly added to the DC/DC converter. However, such an increase in circuitry size is small in comparison with the case of adding a large-capacity capacitor to the DC/DC converter. With this, the output voltage can be kept constant while suppressing an increase in circuitry size and cost.

As explained above, according to the present embodiment, the output current of the DC/DC converter flowing to the load circuit is measured. When the change speed of the output current becomes greater than the threshold speed, the duty ratio corrected through feedback control by the analog circuit is further corrected. With this, the duty ratio can be determined on the assumption in advance of an increase or decrease of the output voltage in association with an abrupt change of the output current. In other words, the duty ratio can follow changes of the output current and the output voltage even without providing an additional circuit, such as a large-capacity capacitor, thereby keeping the output voltage constant while suppressing an increase in circuitry size and cost.

Fourth embodiment

A feature of a fourth embodiment in the present invention is that, in place of correcting the duty ratio itself, feedback control is performed upon correction of the output voltage when the output current is abruptly changed.

Figure 11:
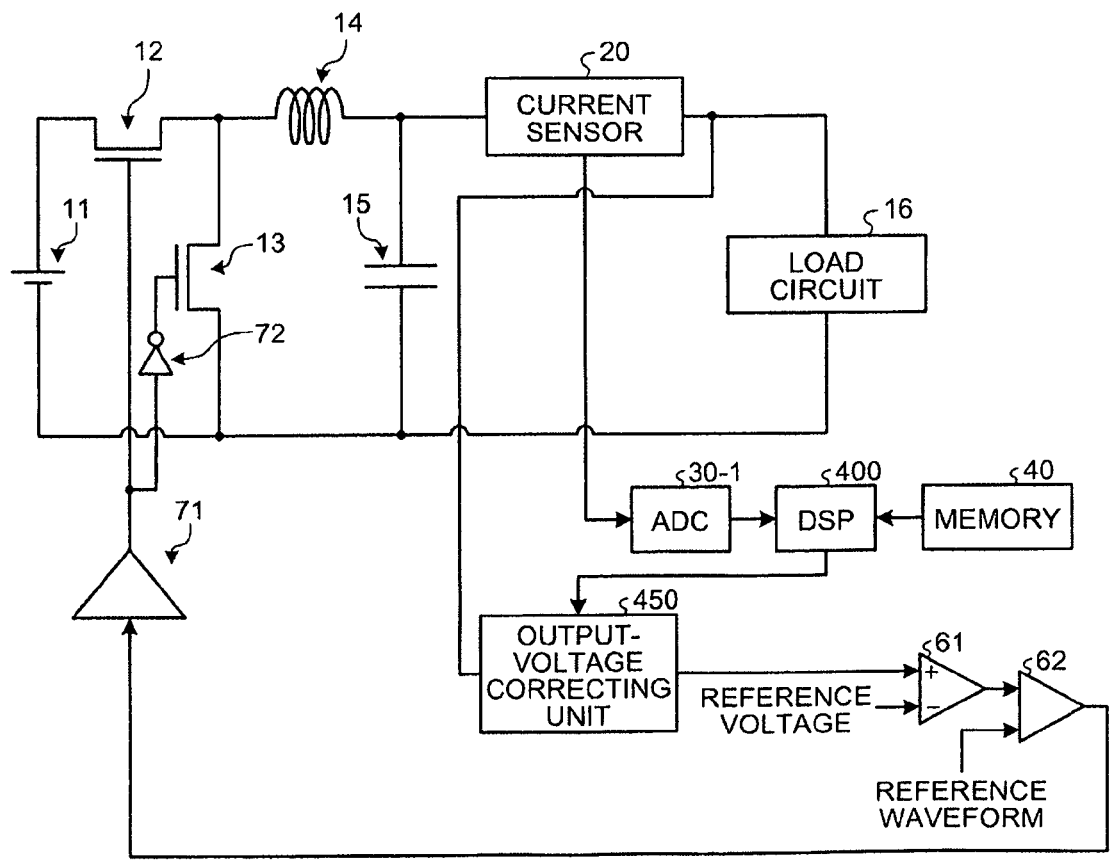
FIG. 11 is a drawing of a schematic configuration of a DC/DC converter according to a fourth embodiment.

FIG. 11 is a drawing of a schematic configuration of a DC/DC converter according to the present embodiment. In the drawing, portions identical to those in FIGS. 1, 8, and 14 are provided with the same reference numerals, and are not explained herein. The DC/DC converter depicted in FIG. 11 is a switching converter that converts a power-supply voltage of the DC power supply 11 to an output voltage to be applied to the load circuit 16. Specifically, the DC/DC converter depicted in FIG. 11 includes a DSP 400 and an output-voltage correcting unit 450 in place of the DSP 300 and the combining unit 350 of the DC/DC converter depicted in FIG. 8. Furthermore, the DC/DC converter depicted in FIG. 11 includes an amplifier 71 and an inverting circuit 72 in place of the driver 50 of the DC/DC converter depicted in FIGS. 1 and 8.

The DSP 400 obtains from the memory 40 an increase or decrease of the output voltage predicted based on the change speed of the current value output from the ADC 30-1, and then outputs the obtained one to the output-voltage correcting unit 450. That is, when a change of the output current is abrupt more than a predetermined criterion, the DSP 400 obtains a future voltage change amount in association with the change of the output current.

Figure 12:
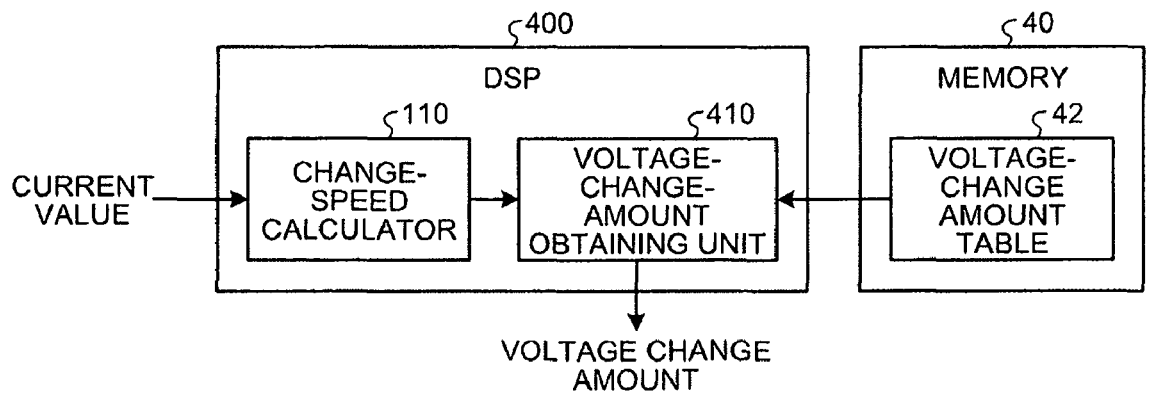
FIG. 12 is a block diagram of an internal configuration of a DSP according to the fourth embodiment.

Specifically, an internal configuration of the DSP 400 is as depicted in FIG. 12. In the drawing, portions identical to those in FIG. 2 are provided with the same reference numerals, and are not explained herein. As depicted in FIG. 12, the DSP 400 includes the changing-speed calculator 110 and a voltage-change-amount obtaining unit 410. Also, the memory 40 stores a voltage-change-amount table 42.

When the change speed calculated by the changing-speed calculator 110 is greater than a predetermined threshold speed, the voltage-change-amount obtaining unit 410 reads from the voltage-change-amount table 42 a voltage change amount of the output voltage corresponding to the change speed, and then outputs the read voltage change amount to the output-voltage correcting unit 450. Specifically, when the output current abruptly changes, the voltage-change-amount obtaining unit 410 obtains a voltage change amount indicative of a future predictive value of an increase or decrease of the output voltage in association with the change of the output current. When the change speed of the output current is equal to or smaller than the predetermined threshold speed, the voltage-change-amount obtaining unit 410 obtains 0 from the voltage-change-amount table 42 as a voltage change amount.

The voltage-change-amount table 42 retains a voltage change amount of the output voltage corresponding to the change speed of the output current. Specifically, the voltage-change-amount table 42 retains 0 as a voltage change amount for a change speed equal to or smaller than the threshold speed. For a change speed greater than the threshold speed, the voltage-change-amount table 42 retains a voltage change amount according to the magnitude of the change speed. That is, the voltage-change-amount table 42 retains a voltage changing amount of the output voltage after a possible increase or decrease in the future with respect to the change speed of the output current that abruptly changes.

Referring back to FIG. 11, the output-voltage correcting unit 450 adds the voltage change amount output from the DSP 400 to the output voltage output from the DC/DC converter to the load circuit 16, and then outputs the addition result to the operational amplifier 61. That is, the output-voltage correcting unit 450 corrects the current output voltage to a predictive output voltage after change in the future, and then outputs the corrected output voltage to the analog circuit that performs feedback control over the output voltage.

The amplifier 71 amplifies the pulse as a result of feedback control result output from the comparator 62, and then outputs the amplified pulse to the transistor 12 and the inverting circuit 72. The amplifier 71 then causes the transistor 12 to be in a continuity state while the amplified pulse is in an ON state. The inverting circuit 72 inverts the pulse output from the amplifier 71, and causes the transistor 13 to perform an operation reverse to that of the transistor 12. That is, the inverting circuit 72 causes the transistor 13 to be in a continuity state while the pulse amplified by the amplifier 71 is in an OFF state. These amplifier 71 and inverting circuit 72 perform an operation similar to that of the driver 50 in FIGS. 1 and 8.

Figure 13:
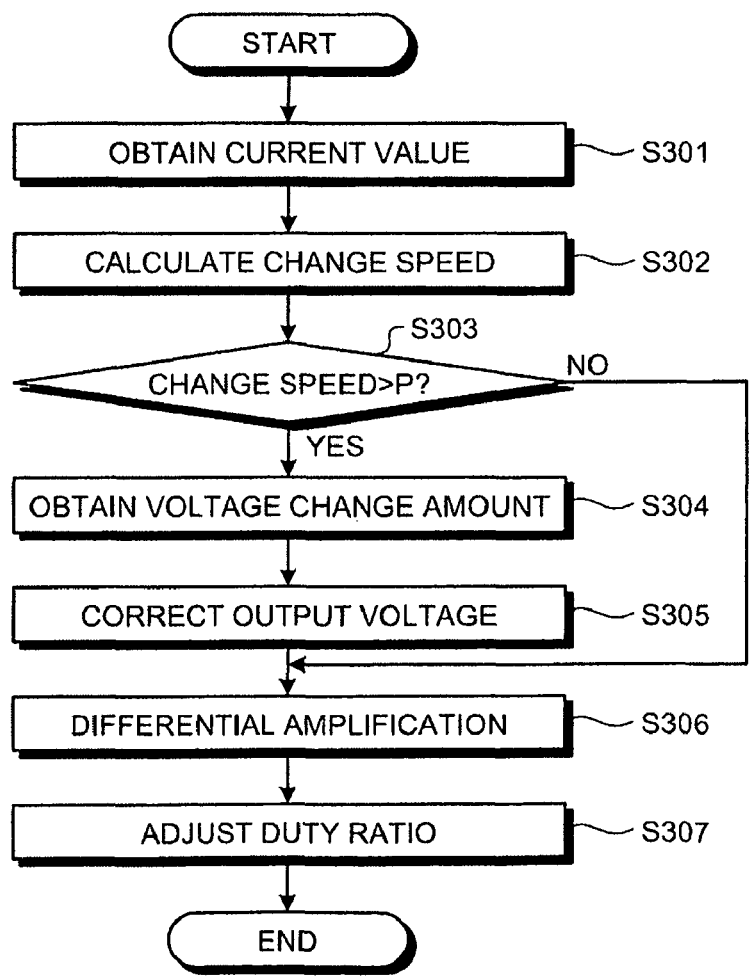
FIG. 13 is a flow diagram of a voltage converting method according to the fourth embodiment.

Next, a voltage converting method in the above-configured DC/DC converter is explained with reference to a flow diagram depicted in FIG. 13. The flow diagram in FIG. 13 mainly depicts a process of the DSP 400 and the output-voltage correcting unit 450.

When the transistors 12 and 13 are switched according to the pulse output from the amplifier 71 or the inverting circuit 72, the power-supply voltage from the DC power supply 11 is converted to an output voltage according to the duty ratio of the pulse. After rectified and smoothed by the coil 14 and the capacitor 15, the output voltage is applied to the load circuit 16.

At this time, the output current in association with the output voltage is measured by the current sensor 20, and the measured current value is then converted by the ADC 30-1 to a digital signal. The current value of the output current converted to a digital signal is obtained by the DSP 400 (Step S301). That is, the current value of the output current is input to the changing-speed calculator 110, whilst the output voltage is input to the output-voltage correcting unit 450.

Then, a change speed of the output current is calculated by the changing-speed calculator 110 (Step S302). In other words, the current value of the output current is monitored by the changing-speed calculator 110, and a change speed serving as an index indicative of whether the output current abruptly changes is calculated. It is assumed herein that feedback control cannot follow an increase or decrease of the output voltage when the change speed of the output current is greater than the threshold speed P.

The change speed calculated by the changing-speed calculator 110 is output to the voltage-change-amount obtaining unit 410. By the voltage-change-amount obtaining unit 410, whether the change speed is greater than the threshold speed P is determined (Step S303). When it is determined that the change speed of the output current is equal to or smaller than the threshold speed P ("No" at Step S303), feedback control can follow an increase or decrease of the output voltage. Therefore, 0 is obtained as the current change amount by the voltage-change-amount obtaining unit 410 from the voltage-change-amount table 42, and the output-voltage correcting unit 450 is instructed to output the output voltage as it is to the operational amplifier 61. Then, the actual output voltage is output by the output-voltage correcting unit 450 to the operational amplifier 61 without correction.

On the other hand, when the change speed of the output current is greater than the threshold speed P ("Yes" at Step S303), the voltage changing amount corresponding to the change speed is obtained from the voltage-change-amount table 42 by the voltage-change-amount obtaining unit 410 (Step S304). The voltage changing amount obtained here is a predictive value of an increase or decrease of the output voltage in association with an abrupt change of the output current. And, since the voltage change amount corresponds to an abrupt change of the output current, the increase or decrease is the one that cannot be followed by normal feedback control.

The voltage change amount obtained by the voltage-change-amount obtaining unit 410 is output to the output-voltage correcting unit 450, and is added to the output voltage by the output-voltage correcting unit 450, thereby correcting the output voltage (Step S305). Therefore, the output voltage after correction is different from the actual output voltage, and has added thereto a future increase or decrease of the output voltage in association with an abrupt change of the output current. Then, the output voltage after correction is output by the output-voltage correcting unit 450 to the operational amplifier 61.

When it is determined from the process explained above that the change speed of the output current is equal to or smaller than the threshold speed P, the actual output voltage is input to the operational amplifier 61. When the change speed of the output current is greater than the threshold speed P, the corrected output voltage is input to the operational amplifier 61. The input output voltage and the reference voltage are then differential-amplified by the operational amplifier 61 (Step S306). The obtained difference between the output voltage and the reference voltage is compared with the reference waveform by the comparator 62, thereby adjusting the duty ratio (Step S307).

As with the third embodiment, the duty ratio is adjusted by the operational amplifier 61 and the comparator 62 through normal feedback control over an increase or decrease of the output voltage. However, in the present embodiment, when the change speed of the output current is greater than the threshold speed P, the output voltage is corrected by the output-voltage correcting unit 450. Therefore, when the output voltage increases or decreases in association with an abrupt change of the output current, the duty ratio is corrected according to a predictive future output voltage. As a result, the duty ratio is corrected on the assumption of a large increase or decrease of the output voltage in association with an abrupt change of the output current, thereby suppressing a delay in feedback control with respect to an increase or decrease of the output voltage.

As explained above, according to the present embodiment, the output current of the DC/DC converter flowing to the load circuit is measured. When the change speed of the output current becomes greater than the threshold speed, the output voltage is corrected to a predictive future output voltage, and then feedback control is performed. Therefore, when the output current abruptly changes, the duty ratio is corrected in preparation for a predictive increase or decrease of the output voltage. As a result, the duty ratio can follow an abrupt change of the output current even without an additional circuit, thereby keeping the output voltage constant while suppressing an increase in circuitry size and cost.

Note that it is possible to generate a duty-ratio determining program in which the process by the current sensor 20, the DSPs 100 to 400, the combining unit 350, and the output-voltage correcting unit 450 explained in each embodiment above is described in a computer-executable format and causes a computer to execute this duty-ratio determining program. In this case, it is also possible to store the duty-ratio determining program in a computer-readable recording medium and use this recording medium to introduce the duty-ratio determining program into the computer.

Also, the second embodiment can be performed in combination with the third embodiment. That is, in the third embodiment, in place of correcting the duty ratio by the correction amount, the loop gain may be adjusted by adjusting the gain of the operational amplifier 61, for example, as in the second embodiment. Even in this case, when the output current abruptly changes, feedback control is more responsive to the increase or decrease of the output voltage, and the duty ratio can be determined on the assumption in advance of an increase or decrease of the output voltage in association with an abrupt change of the output current.

Furthermore, in the first and third embodiments, the correction-amount obtaining unit 120 obtains a correction amount of the duty ratio from the correction-amount table 41 stored in the memory 40. Alternatively, the correction-amount obtaining unit 120 may obtain a voltage change amount of the output voltage from the voltage-change-amount table 42 to calculate a correction amount of the duty ratio corresponding to the obtained voltage change amount. In this case, the memory according to the first and third embodiments stores the voltage-change-amount table 42 in place of the correction-amount table 41.

Still further, in each embodiment above, the transistors 12 and 13 are used as switching elements. Alternatively, normal switches may be used as switching elements as long as they can switch between a continuity state and an interruption state according to a pulse. Also, as a replacement for the transistor 13, which is in a continuity state while the transistor 12 is in an interruption state, a diode or the like can be used. In short, all what is required is that while one switching element is in a continuity state, the other element is in an interruption state, and the duty ratio for controlling these continuity state and interruption state can be determined through the present invention.

According to an embodiment, the duty ratio can be determined on the assumption in advance of an increase or decrease of the output voltage in association with an abrupt change of the output current. In other words, the duty ratio can follow changes of the output current and the output voltage even without providing an additional circuit, such as a large-capacity capacitor, thereby keeping the output voltage constant while suppressing an increase in circuitry size and cost.

According to the voltage converting device, voltage converting method, and duty-ratio determining program disclosed herein, the output voltage can be kept constant while suppressing an increase in circuitry size and cost.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A voltage converting device comprising:
   a converting unit that converts a power-supply voltage to an output voltage by switching between continuity and interruption of each of a plurality of switching elements according to a duty ratio indicative of a time ratio between a continuity time and an interruption time of the switching element;
   a measuring unit that measures an output current flowing through a load circuit to which the output voltage obtained through conversion by the converting unit is applied;
   a calculator that calculates a change speed of the output current measured by the measuring unit; and
   a determining unit that determines the duty ratio in the converting unit according to the change speed calculated by the calculator.

2. The voltage converting device according to claim 1, wherein
   the determining unit includes a feedback unit that corrects the duty ratio so that the output voltage obtained through conversion by the converting unit is equal to a predetermined reference voltage.

3. The voltage converting device according to claim 2, wherein
   the determining unit
   further includes a correction-amount obtaining unit that obtains a correction amount of the duty ratio corresponding to the change speed calculated by the calculator, and
   corrects the duty ratio corrected by the feedback unit by the correction amount obtained by the correction-amount obtaining unit.

4. The voltage converting device according to claim 3, wherein
   when the change speed is equal to or smaller than a predetermined threshold speed, the correction-amount obtaining unit obtains 0 as the correction amount, and when the change speed is greater than the predetermined threshold speed, the correction-amount obtaining unit obtains a value according to the change speed as the correction amount.

5. The voltage converting device according to claim 2, wherein
   the determining unit further includes a loop-gain adjusting unit that determines whether the change speed calculated by the calculator is greater than a predetermined threshold speed, and
   when it is determined by the loop-gain adjusting unit that the change speed is greater than the predetermined threshold speed, the determining unit increases a loop gain of the feedback unit.

6. The voltage converting device according to claim 2, wherein
   the feedback unit includes:
   a comparator that compares the output voltage and a predetermined reference voltage with each other; and
   a correcting unit that corrects the duty ratio according to a difference between the output voltage and the predetermined reference voltage based on the comparison result from the comparator.

7. The voltage converting device according to claim 2, wherein
   the determining unit further includes:
   a voltage-change-amount obtaining unit that obtains a voltage change amount that corresponds to the change speed calculated by the calculator and indicates a predictive value of an increase or decrease of the output voltage according to a change of the output current; and
   an output-voltage correcting unit that corrects the output voltage obtained through conversion by the converting unit by the voltage change amount obtained by the voltage-change-amount obtaining unit, and
   the feedback unit corrects the duty ratio so that the output voltage after correction by the output-voltage correcting unit is equal to the predetermined reference voltage.

8. The voltage converting device according to claim 7, wherein
   when the change speed is equal to or smaller than a predetermined threshold speed, the voltage-change-amount obtaining unit obtains 0 as the voltage change amount, and when the change speed is greater than the predetermined threshold speed, the voltage-change-amount obtaining unit obtains a value according to the change speed as the voltage change amount.

9. A voltage converting method comprising:
   converting a power-supply voltage to an output voltage by switching between continuity and interruption of each of a plurality of switching elements according to a duty ratio indicative of a time ratio between a continuity time and an interruption time of the switching element;
   measuring an output current flowing through a load circuit to which the output voltage obtained through the converting is applied;
   calculating a change speed of the measured output current; and
   determining the duty ratio in the converting unit according to the calculated change speed.

10. A computer program product having a computer readable medium including programmed instructions for determining a duty ratio of a switching converter that converts a power-supply voltage to an output voltage to be applied to a load circuit by switching continuity and interruption of each of a plurality of switching elements according to a duty ratio indicative of a time ratio between a continuity time and an interruption time of the switching element, wherein the instructions, when executed by a computer, cause the computer to perform:
   obtaining a current value of an output current flowing through the load circuit to which the output voltage corresponding to the duty ratio is applied;
   calculating a change speed of the current value obtained; and
   newly determining a duty ratio according to the calculated change speed.

* * * * *